United States Patent
Rhee et al.

(10) Patent No.: US 9,253,730 B2
(45) Date of Patent: Feb. 2, 2016

(54) TRANSMITTER AND RECEIVER FOR REDUCING POWER CONSUMPTION IN FM-UWB COMMUNICATION SYSTEM

(71) Applicants: SAMSUNG ELECTRONICS CO., LTD., Suwon-si (KR); Tsinghua University, Beijing (CN)

(72) Inventors: Woogeun Rhee, Beijing (CN); Bo Zhou, Beijing (CN); Jong-jin Kim, Hwaseong-si (KR); Dong-wook Kim, Seoul (KR); Zhihua Wang, Beijing (CN)

(73) Assignees: Samsung Electronics Co., Ltd., Suwon-si (KR); Tsinghua University, Beijing (CN)

( * ) Notice: Subject to any disclaimer, the term of this patent is extended or adjusted under 35 U.S.C. 154(b) by 0 days.

(21) Appl. No.: 13/846,978

(22) Filed: Mar. 19, 2013

(65) Prior Publication Data

US 2013/0243043 A1      Sep. 19, 2013

(30) Foreign Application Priority Data

Mar. 19, 2012   (KR) .................. 10-2012-0027756

(51) Int. Cl.
| | | |
|---|---|---|
| *H04B 1/00* | (2006.01) | |
| *H04W 52/02* | (2009.01) | |
| *H04B 1/7163* | (2011.01) | |

(52) U.S. Cl.
CPC ......... *H04W 52/028* (2013.01); *H04B 1/71632* (2013.01)

(58) Field of Classification Search
CPC .................. H04W 52/028; H04B 1/71632

USPC .......................................................... 375/146
See application file for complete search history.

(56) References Cited

U.S. PATENT DOCUMENTS

| | | | |
|---|---|---|---|
| 5,790,946 A | 8/1998 | Rotzoll | |
| 5,826,173 A | 10/1998 | Dent | |
| 6,130,602 A | 10/2000 | O'Toole et al. | |
| 6,236,488 B1 * | 5/2001 | Shimizu et al. | 398/198 |

(Continued)

FOREIGN PATENT DOCUMENTS

| | | |
|---|---|---|
| EP | 1 919 078 A1 | 5/2008 |
| EP | 2 057 746 B1 | 2/2011 |

(Continued)

OTHER PUBLICATIONS

Anis, et al. "A 2.5 mW 2Mb/s fully integrated impulse-FM-UWB transceiver in 0.18 μm CMOS." *Microwave Symposium Digest (MTT), 2011 IEEE MTT-S International.* IEEE, 2011 (3 pages, in English).

(Continued)

*Primary Examiner* — Erin File
(74) *Attorney, Agent, or Firm* — NSIP Law (57) ABSTRACT

A transmitter and a receiver for reducing power consumption in a frequency modulation-ultra-wideband (FM-UWB) communication system are provided. The transmitter includes a detector configured to generate a pulse signal when an edge of a digital signal is detected. The transmitter further includes a first modulator configured to modulate the digital signal into a first modulation signal based on a value of the digital signal. The transmitter further includes a second modulator configured to modulate the first modulation signal into a second modulation signal based on a frequency of the first modulation signal when the pulse signal is generated.

9 Claims, 7 Drawing Sheets

(56) References Cited

U.S. PATENT DOCUMENTS

| | | | |
|---|---|---|---|
| 6,278,698 B1 | 8/2001 | O'Toole et al. | |
| 6,442,142 B1 | 8/2002 | Bar-Niv | |
| 6,658,053 B1 * | 12/2003 | Aiello et al. | 375/224 |
| 7,209,523 B1 | 4/2007 | Larrick et al. | |
| 7,394,869 B2 * | 7/2008 | Jensen et al. | 375/302 |
| 2004/0190911 A1 * | 9/2004 | Franco et al. | 398/189 |
| 2007/0110125 A1 * | 5/2007 | Fujita et al. | 375/130 |
| 2007/0174907 A1 * | 7/2007 | Davis | 726/9 |
| 2007/0206234 A1 * | 9/2007 | Ozasa et al. | 358/471 |
| 2008/0055139 A1 * | 3/2008 | Seo et al. | 341/144 |
| 2008/0081572 A1 | 4/2008 | Rofougaran | |
| 2010/0188148 A1 * | 7/2010 | Mehta et al. | 330/149 |
| 2011/0006816 A1 * | 1/2011 | Bazes | 327/117 |
| 2011/0261875 A1 * | 10/2011 | Alexander et al. | 375/238 |
| 2012/0127984 A1 * | 5/2012 | Feher | 370/342 |
| 2012/0155524 A1 * | 6/2012 | Yoshida et al. | 375/224 |

FOREIGN PATENT DOCUMENTS

| | | |
|---|---|---|
| JP | 2005-217899 A | 8/2005 |
| JP | 2006-020289 A | 1/2006 |
| WO | WO 2008/020216 A1 | 2/2008 |
| WO | WO 2008/052905 A1 | 5/2008 |

OTHER PUBLICATIONS

Gupta, et al. "End to end vital sign monitoring system with FM-UWB technology." Devices and Communications (ICDeCom), 2011 International Conference on. IEEE, 2011 (5 pages, in English).

Zhou, et al. "A gated FM-UWB system with data-driven front-end power control." Circuits and Systems I: Regular Papers, IEEE Transactions on 59.6 (2012): 1348-1358 (in English).

Extended European Search Report issued Jul. 8, 2013 in counterpart European Application No. 13159692.6 (5 pages, in English).

* cited by examiner

TRANSMITTER AND RECEIVER FOR REDUCING POWER CONSUMPTION IN FM-UWB COMMUNICATION SYSTEM

CROSS-REFERENCE TO RELATED APPLICATION(S)

This application claims the benefit under Korean Patent Application No. 10-2012-0027756, filed on Mar. 19, 2012, in the Korean Intellectual Property Office, the entire disclosure of which is incorporated herein by reference for all purposes.

BACKGROUND

1. Field

The following description relates to transmitters and receivers in frequency modulation-ultra-wideband (FM-UWB) communication systems.

2. Description of the Related Art

Ultra-wideband (UWB) has drawn attention as a very promising technology in the fields of wireless communications, imaging, and sensors, as its capabilities of transmitting multimedia data at a high speed of hundreds of megabits per second (Mbps) to 1 gigabit per second (Gbps) and of detecting a precise location are highlighted. As UWB has been permitted for commercial use in the field of wireless communications, various attempts have been made to use UWB in short-range wireless personal area networks.

The Federal Communications Commission in the United States has defined UWB as a wireless communication technology including a spectrum that occupies a bandwidth greater than or equal to 20% of a center frequency, or a bandwidth of at least 500 megahertz (MHz). Accordingly, existing carrier modulation including a spectrum that occupies a bandwidth of at least 500 MHz may be considered as UWB. In general, UWB is regarded as a low-power, high-speed, short-range wireless communication technology that may perform communication in a range from 3.1 to 10.6 gigahertz (GHz) at a rate of 100 Mbps or more over a band wider than that of a conventional communication technology. UWB uses an extremely wide band, and requires relatively low power. A UWB system is based on a lower power spectral density over a very wide frequency band than that of a conventional narrowband system or a wideband code division multiple access (CDMA) system. Since the UWB system spreads and transmits a signal over a bandwidth of several GHz in order to prevent interference with another communication system, the UWB system may provide communications without interfering with another narrowband signal and without being greatly affected by a frequency. As a result, the UWB system may share a frequency spectrum and require very low power. UWB has been studied in Institute of Electrical and Electronics Engineers (IEEE) 802.15.3a, which is a UWB standard for a wireless personal area network (WPAN), and in IEEE 802.15.4A, which is a UWB standard for a low-rate and low-power WPAN including a wireless positioning function.

Unlike a conventional wireless communication system using a continuous sine wave signal, an impulse radio (IR)-UWB system includes a transmitter that discontinuously transmits a Gaussian monocycle pulse or a pulse with a narrow width of 1 nanosecond (ns) or so. Accordingly, the IR-UWB system may transmit a signal using a much wider band (hundreds of MHz to several GHz) than a data modulation band, and thus, may greatly reduce a power spectral density, thereby reducing interference. Also, since the IR-UWB system uses such a pulse, the IR-UWB system is very resilient to multi-path fading. Unlike a conventional wireless communication system that puts a signal to be transmitted on a carrier, performs upward modulation and amplification of the signal, and transmits the modulated and amplified signal, the IR-UWB system modulates a baseband signal into an impulse signal, and directly transmits the impulse signal. Accordingly, the IR-UWB system may be simply constructed at low cost.

SUMMARY

In one general aspect, there is provided a transmitter including a detector configured to generate a pulse signal when an edge of a digital signal is detected. The transmitter further includes a first modulator configured to modulate the digital signal into a first modulation signal based on a value of the digital signal. The transmitter further includes a second modulator configured to modulate the first modulation signal into a second modulation signal based on a frequency of the first modulation signal when the pulse signal is generated.

The second modulator may be further configured to be cut off from a power supply when the pulse signal is not generated.

The first modulator may be further configured to output the first modulation signal when the pulse signal is generated.

The first modulator may be further configured to be cut off from a power supply when the pulse signal is not generated.

The transmitter may further include an amplifier configured to amplify the second modulation signal when the pulse signal is generated.

The transmitter may further include an amplifier configured to amplify the second modulation signal, and be cut off from a power supply when the pulse signal is not generated.

The detector may include a time delay unit configured to delay the digital signal by a predetermined period of time to generate a delayed signal. The detector may further include an XOR gate configured to not output the pulse signal when the digital signal and the delayed signal include the same voltage, and output the pulse signal when the digital signal and the delayed signal include different voltages.

In another general aspect, there is provided a receiver including a detector configured to generate a pulse signal when an envelope of an input signal is detected. The receiver further includes a first demodulator configured to demodulate the input signal into a demodulation signal based on a waveform of the input signal when the pulse signal is generated. The receiver further includes a second demodulator configured to demodulate the demodulation signal into a digital signal based on a frequency of the demodulation signal.

The first demodulator may be further configured to be cut off from a power supply when the pulse signal is not generated.

The second demodulator may be further configured to output the digital signal when the pulse signal is generated.

The second demodulator may be further configured to be cut off from a power supply when the pulse signal is not generated.

The receiver may further include an amplifier configured to amplify the input signal when the pulse signal is generated.

The receiver may further include an amplifier configured to amplify the input signal, and be cut off from a power supply when the pulse signal is not generated.

The detector may include a rectifier configured to rectify the input signal. The detector may further include a low-pass filter configured to pass a low-frequency component of the rectified input signal to generate the pulse signal.

In still another general aspect, there is provided a transmitting method including generating a pulse signal when an edge of a digital signal is detected. The transmitting method further includes modulating the digital signal into a first modulation signal based on a value of the digital signal. The transmitting method further includes modulating the first modulation signal into a second modulation signal based on a frequency of the first modulation signal when the pulse signal is generated.

The transmitting method may further include determining the frequency of the first modulation signal based on the value of the digital signal. The transmitting method may further include determining a waveform of the second modulation signal based on the frequency of the first modulation signal, the second modulation signal being a ultra-wideband (UWB) signal.

In yet another general aspect, there is provided a receiving method including generating a pulse signal when an envelope of an input signal is detected. The receiving method further includes demodulating the input signal into a demodulation signal based on a waveform of the input signal when the pulse signal is generated. The receiving method further includes demodulating the demodulation signal into a digital signal based on a frequency of the demodulation signal.

The receiving method may further include determining the frequency of the demodulation signal based on the waveform of the input signal, the input signal being a ultra-wideband (UWB) signal. The receiving method may further include determining a value of the digital signal based on the frequency of the demodulation signal.

In another general aspect, there is provided a computer-readable storage medium storing a program including instructions to cause a computer to generate a pulse signal based on a digital signal. The computer is further caused to modulate the digital signal into a modulation signal. The computer is further caused to modulate the modulation signal into an output signal based on the pulse signal.

The computer may be further caused to modulate the modulation signal into the output signal when the pulse signal is generated.

Other features and aspects may be apparent from the following detailed description, the drawings, and the claims.

BRIEF DESCRIPTION OF THE DRAWINGS

These and/or other aspects will become apparent and more readily appreciated from the following description of the examples, taken in conjunction with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

As used herein, the term "and/or" includes any and all combinations of one or more of the associated listed items.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
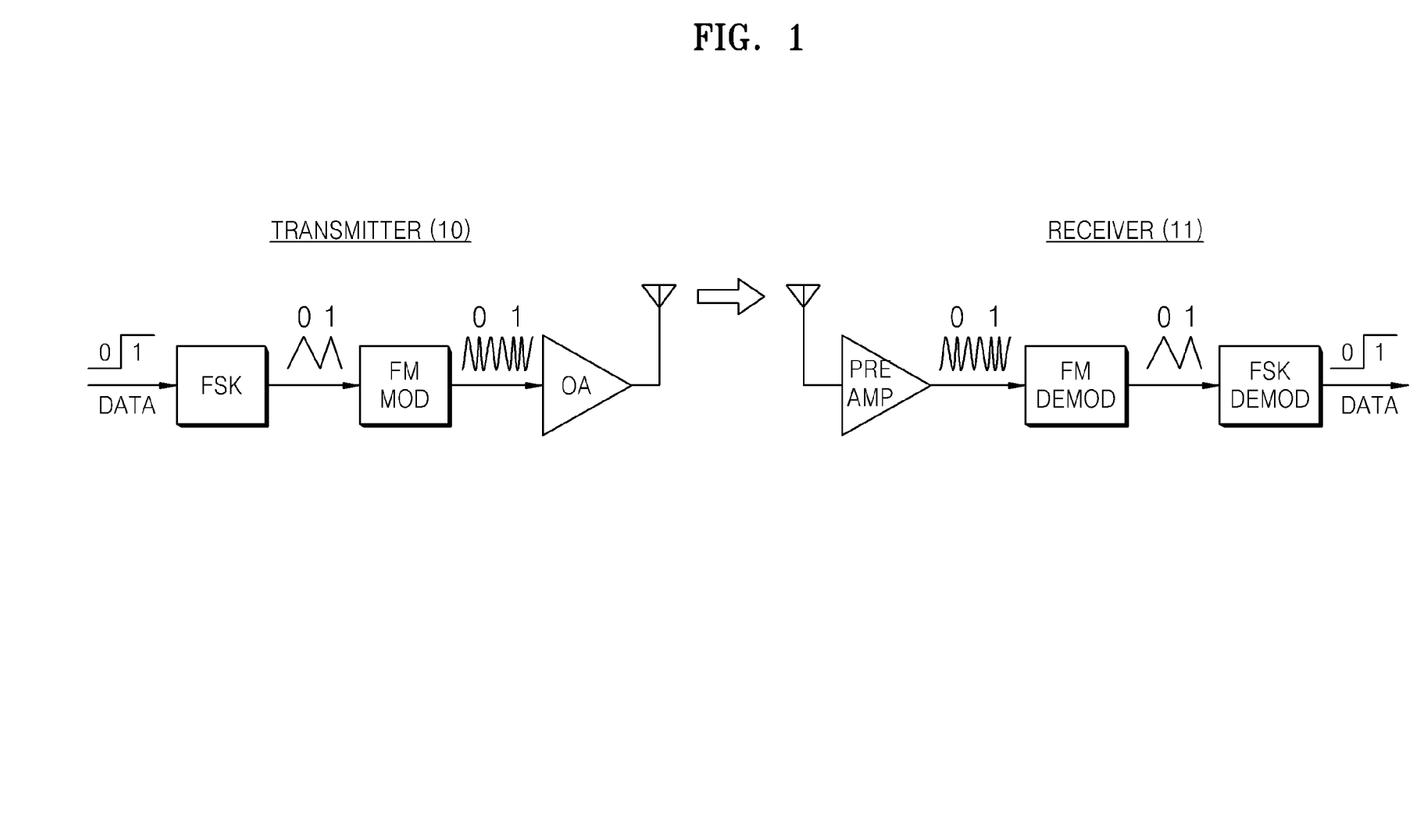
FIG. 1 is a block diagram illustrating an example of a frequency modulation-ultra-wideband (FM-UWB) communication system.

FIG. 1 is a block diagram illustrating an example of a frequency modulation-ultra-wideband (FM-UWB) communication system. Referring to FIG. 1, the FM-UWB communication system includes a transmitter 10 and a receiver 11. The transmitter 10 modulates a digital signal into a UWB signal, and transmits the UWB signal. The receiver 11 receives the UWB signal, and demodulates the UWB signal into a digital signal.

In more detail, the transmitter 10 receives a digital signal, modulates the digital signal into a frequency-shift keying (FSK.) modulation signal through FSK modulation, modulates the FSK modulation signal into a UWB signal through FM, and transmits the UWB signal. The term "digital signal" refers to data composed of 0 and 1.

The transmitter 10 includes an FSK modulator ("FSK") and an FM modulator ("FM MOD"). The FSK modulator modulates a digital signal into an FSK modulation signal. The FSK modulation signal is a signal including a frequency that varies according to the digital signal being 0 and 1. For example, the FSK modulator may output a signal including a frequency of 1 MHz when the digital signal is 0, may output a signal including a frequency of 5 MHz when the digital signal is 1, or vice versa. Although the FSK modulation signal is a triangle wave signal in FIG. 1, the example is not limited thereto, and the FSK modulation signal may be modulated into an analog signal including a waveform other than a triangle wave signal. While the frequency of the FSK modulation signal varies, a minimum voltage and a maximum voltage of the FSK modulation signal may be maintained to be constant. That is, the FSK modulation signal may include a constant amplitude and the varying frequency. For example, when an amplitude of a FSK modulation signal including a high frequency ranges from 1 volt (V) to 5 V, an amplitude of a FSK modulation signal including a low frequency may also range from 1 V to 5 V.

The FM modulator modulates the FSK modulation signal into a UWB signal including another waveform according to the frequency of the FSK modulation signal input from the FSK modulator, and outputs the UWB signal, e.g., through an output amplifier ("OA") and an antenna. The UWB signal may be a sine wave signal. When a triangle wave signal is input into the FM modulator, a frequency of the UWB signal output from the FM modulator is increased in sections where the triangle wave signal is increased, and is decreased in sections where the triangle wave signal is decreased. Accordingly, when the FSK modulation signal is rapidly increased or decreased, the frequency of the UWB signal output from the FM modulator is rapidly changed, and when the FSK modulation signal is slowly increased or decreased, the frequency of the UWB signal output from the FM modulator is slowly changed. Frequencies of the UWB signal output from the FM modulator and the FSK modulation signal are proportional to each other, and include a linear relationship therebetween. For example, if the FSK modulation signal is a triangle wave signal, a minimum voltage of the triangle wave signal is 1 V, a maximum voltage of the triangle wave signal is 5 V, a frequency corresponding to the minimum voltage of 1 V is 3 GHz, and a frequency corresponding to the maximum voltage of 5 V is 4 GHz, the FM modulator outputs the UWB signal whose frequency is linearly increased from 3 GHz to 4 GHz while the triangle wave signal is increased from 1 V to 5 V. In this example, the frequency of the UWB signal may be more than several hundred times greater than the frequency of the triangle wave signal. Accordingly, more than several hundred cycles of a sine wave signal whose frequency is increased or decreased may be output from the FM modulator for one cycle of a triangle wave signal.

The receiver 11 receives the UWB signal, e.g., through an antenna and a preamplifier ("PRE AMP"), and demodulates the UWB signal into a digital signal. The receiver 11 includes an FM demodulator ("FM DEMOD") and an FSK demodulator ("FSK DEMOD"). The FM demodulator outputs a demodulation signal that varies according to the frequency of the UWB signal. That is, the FM demodulator outputs the demodulation signal that is increased when the frequency of the UWB signal input into the FM demodulator is increased, and that is decreased when the frequency of the UWB signal is decreased. In this example, the FM demodulator may correspond a minimum frequency and a maximum frequency of the UWB signal to respective voltage values, to generate the demodulation signal that varies between the voltage values. For example, if the minimum frequency of the UWB signal input into the FM demodulator is 3 GHz, the maximum frequency of the UWB signal is 4 GHz, a voltage corresponding to the minimum frequency of 3 GHz is 1 V, a voltage corresponding to the maximum frequency of 4 GHz is 5 V, the FM demodulator outputs the demodulation signal that is increased from 1 V to 5 V while the frequency of the UWB signal is changed from 3 GHz to 4 GHz. Also, the FM demodulator outputs the demodulation signal that is decreased from 5 V to 1 V while the frequency of the UWB signal is changed from 4 GHz to 3 GHz.

The FSK demodulator receives the demodulation signal from the FM demodulator, and outputs a digital signal according to a frequency of the demodulation signal. In more detail, the FSK demodulator discriminates two frequencies, and outputs the digital signal to be 0 when a signal including a low frequency is input, and outputs the digital signal to be 1 when a signal including a high frequency is input. That is, the FSK demodulator outputs a direct current (DC) signal including a low voltage when the frequency of the demodulation signal is low, and outputs a DC signal including a high voltage when the frequency of the demodulation signal is high.

Figure 2:
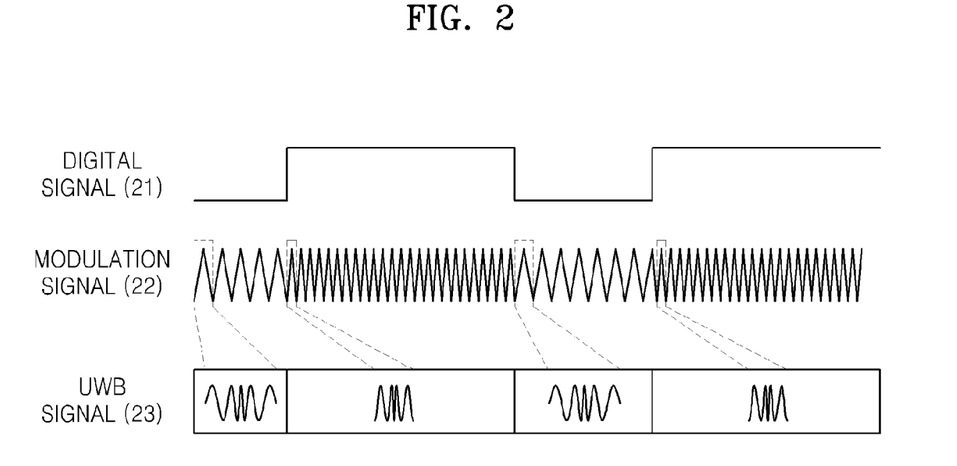
FIG. 2 is a diagram illustrating examples of signals modulated in a transmitter of the FM-UWB communication system of FIG. 1.

FIG. 2 is a diagram illustrating examples of signals modulated in the transmitter 10 of the FM-UWB communication system of FIG. 1. Referring to FIG. 2, the transmitter 10 modulates a digital signal 21 into a modulation signal 22 including another frequency according to the digital signal 21, and outputs a UWB signal 23 whose frequency varies according to the modulation signal 22. The digital signal 21 includes two DC voltages including different levels 0 and 1. A low voltage may be expressed as 0, a high voltage may be expressed as 1, or vice versa.

The modulation signal 22 is a signal whose frequency varies according to the digital signal 21. For example, the modulation signal 22 is a triangle wave signal including a low frequency when the digital signal 21 includes the low voltage, and is a triangle wave signal including a high frequency when the digital signal 21 includes the high voltage. That is, the modulation signal 22 is a triangle wave signal including two frequencies and one amplitude.

The UWB signal 23 is a signal generated by modulating the modulation signal 22 that is a triangle wave signal into a sine wave signal including a wide frequency band. That is, the UWB signal 23 is a sine wave signal whose frequency is increased when the modulation signal 22 is increased in voltage, and is decreased when the modulation signal 22 is decreased in voltage. Accordingly, the frequency of the UWB signal 23 is increased and decreased for one cycle of the modulation signal 22. Since the frequency of the UWB signal 23 is more than 10 times greater than the frequency of the modulation signal 22, more than 10 cycles of the UWB signal 23 is generated for one cycle of the modulation signal 22. The frequency of the UWB signal 23 is rapidly changed when the modulation signal 22 is rapidly changed in voltage. The frequency of the UWB signal 23 is slowly changed when the modulation signal 22 is slowly changed in voltage. A frequency band of the UWB signal 23 is previously set, and the frequency of the UWB signal 23 is repeatedly increased and decreased in the preset frequency band. The UWB signal 23 generated for one cycle of the modulation signal 22 is shown in FIG. 2.

Figure 3:
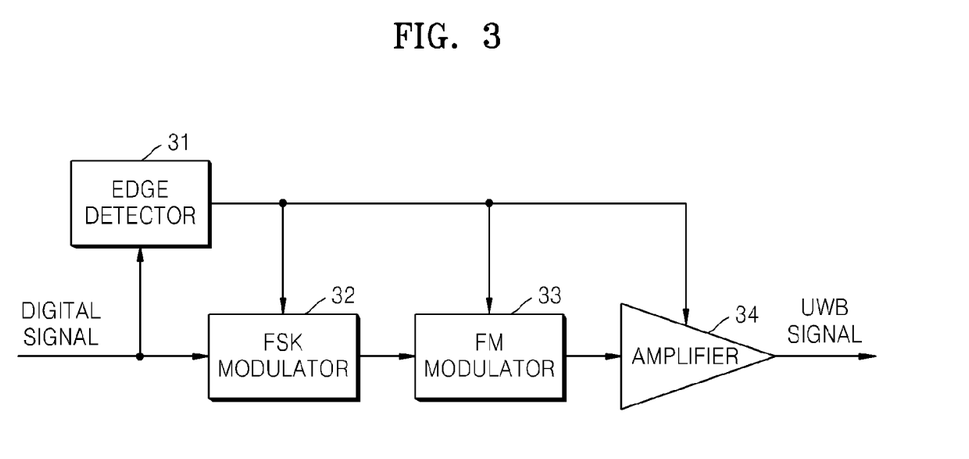
FIG. 3 is a block diagram illustrating an example of the transmitter.

FIG. 3 is a block diagram illustrating an example of the transmitter 10. Referring to FIG. 3, the transmitter 10 includes an edge detector 31, an FSK modulator 32, an FM modulator 33, and an amplifier 34.

The edge detector 31 receives a digital signal indicating data to be transmitted, and generates and outputs a pulse signal when each of edges of the digital is received. That is, the edge detector 31 outputs the pulse signal when the digital signal is changed. The edge detector 31 may output the pulse signal when the digital signal is changed from 0 to 1 and/or from 1 to 0. The edge detector 31 may be a circuit including an XOR logic gate and a time delay unit. The time delay unit delays the digital signal by a predetermined period of time to generate a delayed digital signal, and outputs the delayed digital signal to the XOR logic gate. The XOR logic gate receives the digital signal that is not delayed (referred to as a non-delayed digital signal) and the delayed digital signal, and outputs 1 when only one of the non-delayed digital signal and the delayed digital signal is 1. Accordingly, the XOR logic gate outputs 1 corresponding to the delayed digital signal when the digital signal is changed. That is, the XOR logic gate outputs the pulse signal during the delayed period of time. The edge detector 31 is not limited thereto, and may be any of various circuits.

The edge detector 31 may output the pulse signal to the FSK modulator 32, the FM modulator 33, and/or the amplifier 34. The pulse signal output from the edge detector 31 may be used to control an operation time of the FSK modulator 32, the FM modulator 33, and/or the amplifier 34. That is, a power supply to the FSK modulator 32, the FM modulator 33, and/or the amplifier 34 may be continued when the FSK modulator 32, the FM modulator 33, and/or the amplifier 34 receive the pulse signal from the edge detector 31. The power supply to the FSK modulator 32, the FM modulator 33, and/or the amplifier 34 may be cut off when the FSK modulator 32, the FM modulator 33, and/or the amplifier 34 does not receive the pulse signal from the edge detector 31, thereby reducing unnecessary power consumption. Although the edge detector 31 outputs the pulse signal to the FSK modulator 32, the FM modulator 33, and the amplifier 34 in FIG. 3, the example is not limited thereto, and the edge detector 31 may output the pulse signal to any one of the FM modulator 33, the FSK modulator 32, and the amplifier 34.

The FSK modulator 32 receives the digital signal, and modulates the digital signal into another frequency based on a value of the digital signal, to generate and output a modulation signal. The FSK modulator 32 outputs a triangle wave signal including a low frequency when the digital signal input into the FSK modulator 32 includes a low voltage, and outputs a triangle wave signal including a high frequency when the digital signal input into the FSK modulator 32 includes a high voltage. The FSK modulator 32 may be supplied with power to operate only when the FSK modulator 32 receives the pulse signal from the edge detector 31. Accordingly, the power supply to the FSK modulator 32 may be cut off when the FSK modulator 32 does not receive the pulse signal from the edge detector 31, thereby reducing unnecessary power consumption.

The FM modulator 33 receives the modulation signal from the FSK modulator 32, and modulates the modulation signal into another waveform based on a frequency of the modulation signal, to generate and output a signal. The signal generated from the FM modulator 33 is a UWB signal generated over a wide frequency band. For example, the FM modulator 33 may generate a UWB signal whose bandwidth varies from 3 GHz to 4 GHz based on the modulation signal received from the FSK modulator 32. The FM modulator 33 may be supplied with power to operate only when the FM modulator 33 receives the pulse signal from the edge detector 31. Accordingly, the power supply to the FM modulator 33 may be cut off when the FM modulator 33 does not receive the pulse signal from the edge detector 31. The FM modulator 33 does not need to generate the UWB signal for all signals received from the FSK modulator 32. Since the FM modulator 33 may operate only when the FM modulator 33 receives the pulse signal from the edge detector 31, the FM modulator 33 does not operate for an unnecessary period of time, thereby reducing power consumption.

A triangle wave signal is repeatedly input into the FM modulator 33 from the FSK modulator 32. Since the triangle wave signal is repeatedly input into the FM modulator 33 from the FSK modulator 32, although the triangle wave signal is shown to be input for only one cycle, the triangle wave signal is also input for other cycles.

Figure 4:
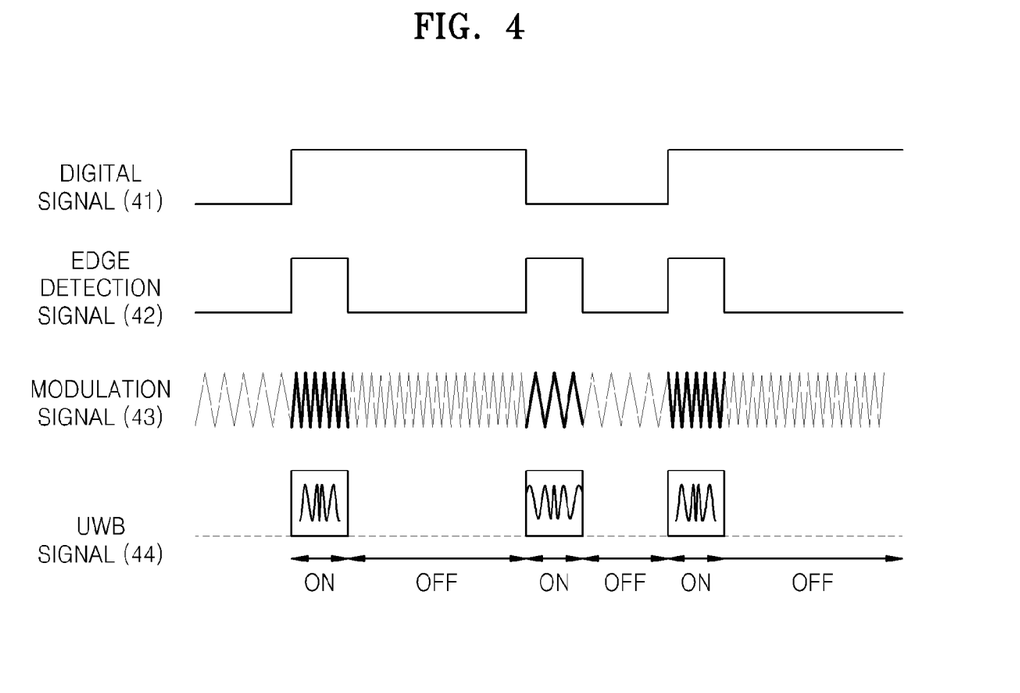
FIG. 4 is a diagram illustrating an example of a method of modulating a digital signal into a UWB signal in the transmitter of FIG. 3.

FIG. 4 is a diagram illustrating an example of a method of modulating a digital signal 41 into a UWB signal 44 in the transmitter 10 of FIG. 3. Referring to FIG. 4, the transmitter 10 modulates the digital signal 41 into a modulation signal 43, and generates an edge detection signal 42 including pulse signals generated when the digital signal 41 is changed.

In more detail, the digital signal 41 includes two DC voltages including different levels 0 and 1. A low voltage may be expressed as 0, a high voltage may be expressed as 1, or vice versa. The digital signal 41 indicates data to be transmitted.

The edge detection signal 42 includes pulse signals generated when the digital signal 41 is changed. That is, the edge detection signal 42 includes the pulse signals generated when the digital signal 41 is changed from the low voltage to the high voltage, and/or from the high voltage to the low voltage.

The edge detection signal 42 may be generated by inputting the digital signal 41 and a delayed digital signal passing through the time delay unit into the XOR logic gate. The XOR logic gate outputs 1 when the digital signal 41 and the delayed digital signal include different voltages, and outputs 0 when the digital signal 41 and the delayed digital signal include the same voltage. Accordingly, when the digital signal 41 and the delayed digital signal are input into the XOR logic gate and the digital signal 41 is changed, since the digital signal 41 is different than the delayed digital signal by as much as a predetermined period of time, the XOR logic gate outputs 1.

The modulation signal 43 is generated by modulating the digital signal 41 through FM. For example, the modulation signal 43 is a triangle wave signal including a low frequency when the digital signal 41 includes the low voltage, is a triangle wave signal including a high frequency when the digital signal 41 includes the high voltage, or vice versa.

The UWB signal 44 is generated by modulating the modulation signal 43. For example, the modulation signal 43 is a triangle wave signal modulated into the UWB signal 44 that is a sine wave signal including a wide frequency band. In this example, the UWB signal 44 is a sine wave signal whose frequency is increased when the modulation signal 43 is increased in voltage, and is a sine wave signal whose frequency is decreased when the modulation signal 43 is decreased in voltage. Accordingly, a frequency of the UWB signal 44 is increased and decreased for one cycle of the modulation signal 43. The frequency of the UWB signal 44 is rapidly changed when the modulation signal 43 is rapidly changed, and is slowly changed when the modulation signal 43 is slowly changed. A frequency band of the UWB signal 44 is previously set, and the frequency of the UWB signal 44 is repeatedly increased and decreased in the preset frequency band. The frequency of the UWB signal 44 may be more than several hundred times greater than a frequency of the modulation signal 43. Accordingly, more than 10 cycles of the UWB signal 44 may be generated for one cycle of the modulation signal 43. The UWB signal 44 generated for one cycle of the modulation signal 43 is shown in FIG. 4, and the UWB signal 44 generated for other cycles are not shown.

The UWB signal 44 is generated only when a pulse signal of the edge detection signal 42 is generated. Accordingly, since the UWB signal 44 is not generated when a pulse signal of the edge detection signal 42 is not generated, power consumption of the transmitter 10 may be further reduced than when the UWB signal 44 is generated continuously. Periods of time when the UWB signal 44 is generated and is not generated are indicated by ON and OFF, respectively, in FIG. 4.

Figure 5:
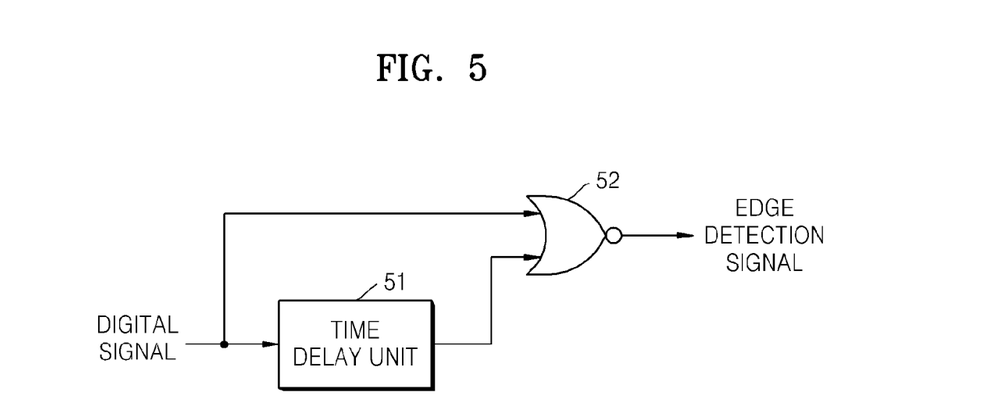
FIG. 5 is a block diagram illustrating an example of an edge detector of the transmitter of FIG. 3.

FIG. 5 is a block diagram illustrating an example of the edge detector 31 of the transmitter 10 of FIG. 3. Referring to FIG. 5, the edge detector 31 includes a time delay unit 51 and an XOR logic gate 52. The edge detector 31 receives a digital signal indicating data to be transmitted, and generates and outputs a pulse signal ("an edge detection signal") when each of edges of the digital signal is received. In more detail, the time delay unit 51 delays the digital signal input thereto by a predetermined period of time to generate a delayed digital signal, and outputs the delayed digital signal to the XOR logic gate 52. The XOR logic gate 52 receives the digital signal and the delayed digital signal, and outputs a constant voltage value (e.g., 1) when the digital signal and the delayed digital signal include different voltages. Accordingly, when the digital signal is changed, since the digital signal is different than the delayed digital signal by as much as the predetermined period of time, the edge detector 31 outputs the pulse signal including the constant voltage value during the delayed period of time.

Although the edge detector 31 of FIG. 3 is shown in FIG. 5, the example is not limited thereto. It will be understood by one of ordinary skill in the art that the edge detector 31 may be constructed in various other ways.

Figure 6:
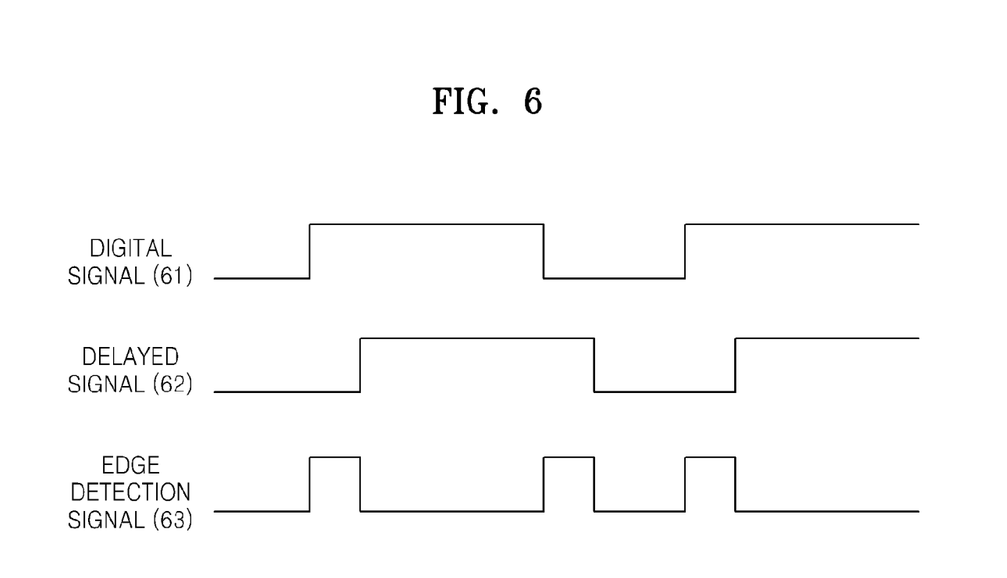
FIG. 6 is a diagram illustrating examples of signals generated in the edge detector of FIG. 5.

FIG. 6 is a diagram illustrating examples of signals generated in the edge detector 31 of FIG. 5. Referring to FIG. 6, the edge detector 31 generates and outputs an edge detection signal 63 based on a digital signal 61 and a delayed signal 62. When the digital signal 61 is input into the edge detector 31, the time delay unit 51 of the edge detector 31 delays the digital signal 61 by a predetermined period of time to generate and output the delayed signal 62. Accordingly, the delayed signal 62 is the same as the digital signal 61 except that the delayed signal 62 is delayed from the digital signal 61. The edge detection signal 63 includes a constant voltage value (e.g., 1) when the digital signal 61 and the delayed signal 62 include different values. That is, the edge detector 31 generates and outputs a pulse signal when the digital signal 61 is changed. When both the digital signal 61 and the delayed signal 62 include the same value (e.g., 1 or 0), the edge detector 31 outputs 0, and when only one of the digital signal 61 and the delayed signal 62 includes 1, the edge detector 31 outputs 1.

Figure 7:
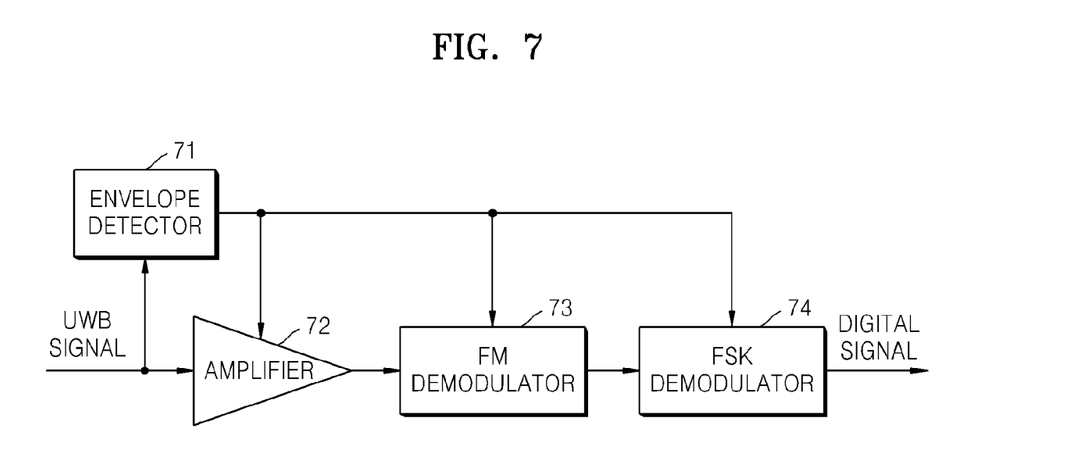
FIG. 7 is a block diagram illustrating an example of a receiver of the FM-UWB communication system of FIG. 1.

FIG. 7 is a block diagram illustrating an example of the receiver 11 of the FM-UWB communication system of FIG. 1. Referring to FIG. 7, the receiver 11 includes an envelope detector 71, an amplifier 72, an FM demodulator 73, and an FSK demodulator 74.

The envelope detector 71 receives a UWB signal, and generates and outputs a pulse signal based on the received UWB signal to control operations of the amplifier 72, the FM demodulator 73, and/or the FSK demodulator 74. In more detail, the amplifier 72, the FM demodulator 73, and/or the FSK demodulator 74 may operate only when the amplifier 72, the FM demodulator 73, and/or the FSK demodulator 74 receive the pulse signal from the envelope detector 71, thereby reducing power consumed by the amplifier 72, the FM demodulator 73, and/or the FSK demodulator 74.

Accordingly, the receiver 11 may control the amplifier 72, the FM demodulator 73, and/or the FSK demodulator 74 to operate only when the amplifier 72, the FM demodulator 73, and/or the FSK demodulator 74 receive the pulse signal from the envelope detector 71. The receiver 11 may further cut off power supply to the amplifier 72, the FM demodulator 73, and/or the FSK demodulator 74 when the amplifier 72, the FM demodulator 73, and/or the FSK demodulator 74 do not receive the pulse signal, thereby reducing power consumed by the amplifier 72, the FM demodulator 73, and/or the FSK demodulator 74. Although the envelope detector 71 outputs the pulse signal to the amplifier 72, the FM demodulator 73, and the FSK demodulator 74 in FIG. 7, the envelope detector 71 may output the pulse signal to any one of the amplifier 72, the FM demodulator 73, and the FSK demodulator 74.

To generate the pulse signal, the envelope detector 71 detects an envelope of the UWB signal during periods of time when the UWB signal is received by the envelope detector 71. The envelope contacts all ripples of the UWB signal. For example, when the UWB signal is a sine wave signal, the envelope is a curve that contacts all waves of the sine wave signal. When the UWB signal is a sine wave signal including a constant amplitude, the envelope may be a straight line.

The UWB signal is transmitted from the transmitter 10 of FIG. 3. The UWB signal is generated in the FM modulator 33 only during periods of time when the edge detector 31 generates and outputs a pulse signal. Since the FM modulator 33 generates the UWB signal only when the edge detector 31 outputs the pulse signal, the UWB signal received by the receiver 11 of FIG. 7 is received during some periods of time and is not received during other periods of time. Accordingly, the envelope of the UWB signal is the pulse signal during the periods of time when the UWB signal is received. The envelope detector 71 outputs the envelope, which is the pulse signal, to the amplifier 72, the FM demodulator 73, and/or the FSK demodulator 74. The pulse signal output from the envelope detector 71 during the periods of time when the UWB signal is received may be referred to as an envelope detection signal. Accordingly, the envelope detector 71 does not output any signal during the other periods of times when the UWB signal is not received.

The FM demodulator 73 receives a UWB signal from the amplifier 72 amplifying the UWB signal, and demodulates the UWB signal into another frequency based on a waveform of the UWB signal, to generate and output a demodulated UWB signal. The FM demodulator 73 may operate only when the FM demodulator 73 receives the pulse signal from the envelope detector 71. Accordingly, since the pulse signal is output from the envelope detector 71 only during the periods of time when the UWB signal is received, the FM demodulator 73 operates only when the UWB signal is received.

The FM demodulator 73 receives the UWB signal, and outputs the demodulated UWB signal proportional to a frequency of the UWB signal. For example, the UWB signal input into the FM demodulator 73 may be a sine wave signal whose frequency is repeatedly increased and decreased. The FM demodulator 73 outputs a signal that is increased in voltage when the frequency of the UWB signal is increased, and outputs a signal that is decreased in voltage when the frequency of the UWB signal is decreased. In this example, the FM demodulator 73 previously sets a width corresponding to a variation range of the frequency of the UWB signal, and outputs a signal varying in the width. The frequency of the UWB signal is repeatedly increased and decreased. When a speed at which the frequency of the UWB signal is changed is high, the FM demodulator 73 outputs a signal including a high frequency, and when a speed at which the frequency of the UWB signal is changed is low, the FM demodulator 73 outputs a signal including a low frequency.

The FSK demodulator 74 receives the demodulated UWB signal from the FM demodulator 73, demodulates the demodulated UWB signal into a digital signal based on a frequency of the demodulated UWB signal, and outputs the digital signal. The digital signal is changed in voltage value when the frequency of the demodulated UWB signal is changed. That is, when the frequency of the demodulation signal is a high frequency, the FSK demodulator 74 outputs a signal including a high DC voltage, and when the frequency of the demodulation signal is a low frequency, the FSK demodulator 74 outputs a signal including a low DC voltage. The signal including the high DC voltage may be a digital signal including a voltage expressed as 1, and the signal including the low DC voltage may be a digital signal including a voltage expressed as 0.

Figure 8:
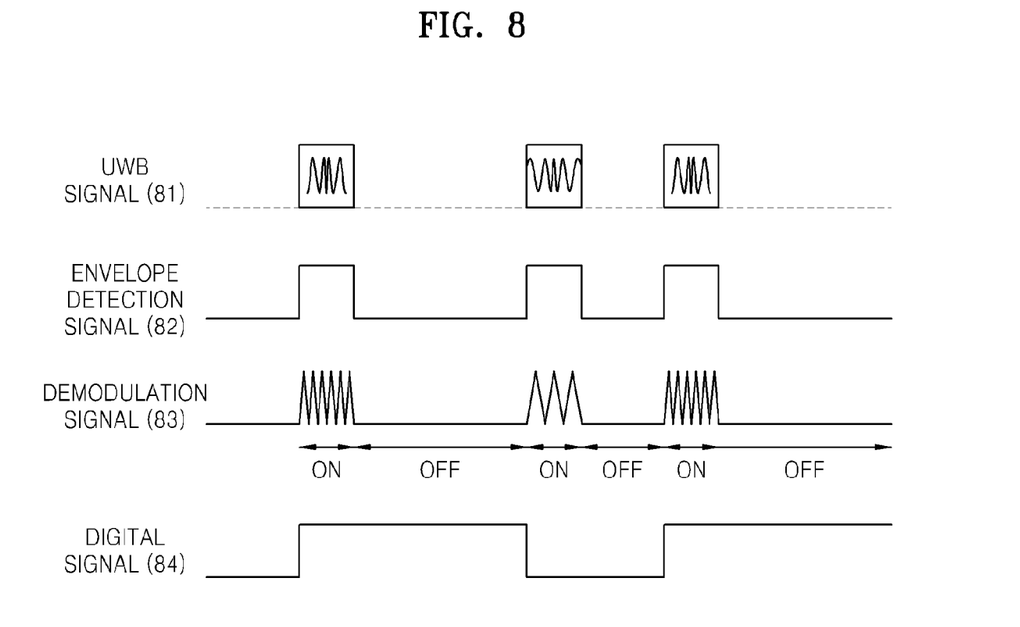
FIG. 8 is a diagram illustrating an example of a method of demodulating a UWB signal in the receiver of FIG. 7.

FIG. 8 is a diagram illustrating an example of a method of demodulating a UWB signal 81 in the receiver 11 of FIG. 7. Referring to FIG. 8, a frequency of the UWB signal 81 is increased and decreased in a frequency band for a predetermined period of time. The UWB signal 81 is generated for one cycle of a demodulation signal 83, and the frequency of the UWB signal 81 may be more than 10 times greater than a frequency of the demodulation signal 83.

An envelope detection signal 82 is a curve contacting all ripples of the UWB signal 81. For example, when the UWB signal 81 is a sine wave signal including a constant amplitude, the envelope detection signal 82 is a pulse signal including a constant amplitude while the UWB signal 81 is received in the receiver 11.

The demodulation signal 83 is a triangle wave signal varying based on the frequency of the UWB signal 81. For example, the demodulation signal 83 is increased in voltage when the frequency of the UWB signal 81 is increased, and is decreased in voltage when the frequency of the UWB signal 81 is decreased. Accordingly, the demodulation signal 83 is a triangle wave signal including a high frequency when the frequency of the UWB signal 81 is rapidly changed, and is a triangle wave signal including a low frequency when the frequency of the UWB signal 81 is slowly changed. The demodulation signal 83 is generated only when the UWB signal 81 is received.

A digital signal 84 includes a value varying based on a frequency of the demodulation signal 83. For example, the digital signal 84 includes a large value when the frequency of the demodulation signal 83 is high, and includes a small value when the frequency of the demodulation signal 83 is low. The value of the digital signal 84 is maintained when there is no demodulation signal 83.

Figure 9:
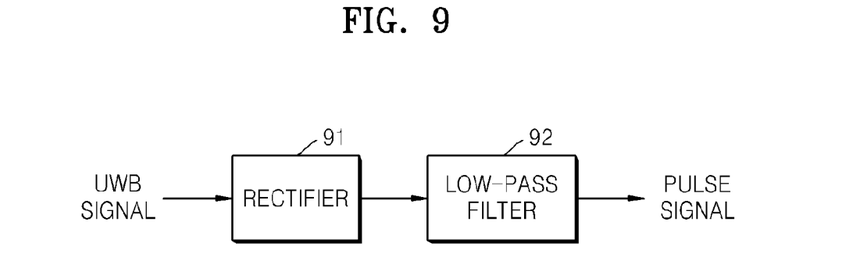
FIG. 9 is a block diagram illustrating an example of an envelope detector of the receiver of FIG. 7.

FIG. 9 is a block diagram illustrating an example of the envelope detector 71 of the receiver 11 of FIG. 7. Referring to FIG. 9, the envelope detector 71 includes a rectifier 91 and a low-pass filter 92. The envelope detector 71 receives a UWB signal, and generates and outputs a pulse signal (i.e., an envelope detection signal) only during periods of time when the UWB signal is received.

In more detail, the rectifier 91 receives the UWB signal, rectifies the UWB signal to generate a rectified signal, and outputs the rectified signal to the low-pass filter 92. The rectifier 91 rectifies the UWB signal in such a manner that components of the UWB signal under a reference line are moved upward to be located over the reference line, and thus, components are only allowed to be located over the reference line.

The low-pass filter 92 passes only a low-frequency component of the rectified signal. Accordingly, the low-pass filter 92 outputs the pulse signal, which is the rectified signal without a high-frequency component and is a DC signal generated while the UWB signal is received.

Although the envelope detector 71 is shown in FIG. 9, the example is not limited thereto. It will be understood by one of ordinary skill in the art that the envelope detector 71 of FIG. 9 may be constructed in various other ways.

Figure 10:
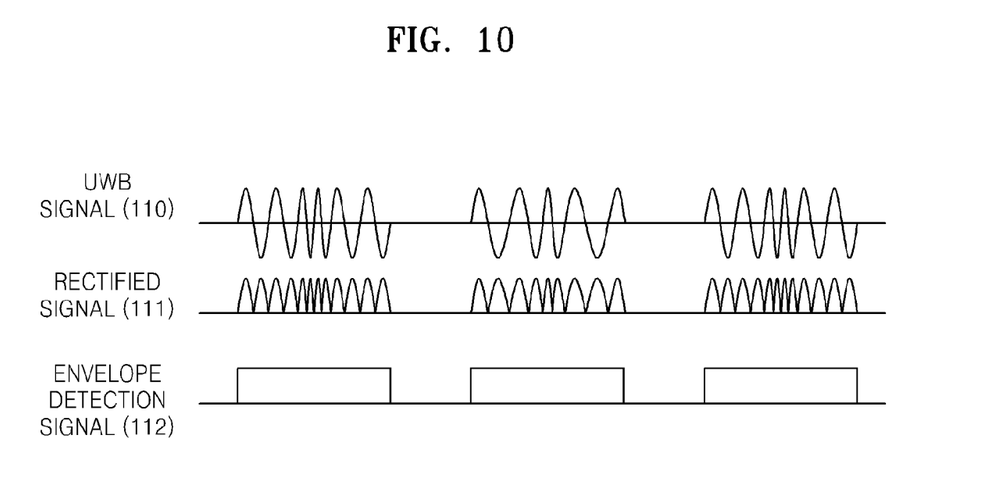
FIG. 10 is a diagram illustrating examples of signals generated in the envelope detector of FIG. 9.

FIG. 10 is a diagram illustrating examples of signals generated in the envelope detector 71 of FIG. 9. Referring to FIG. 10, a UWB signal 110 input into the envelope detector 71 is a sine wave signal whose frequency varies, and includes periods of time when the sine wave signal exists and other periods of time when the sine wave signal does not exist. Since the UWB signal 110 is output from the transmitter 10 of FIG. 3, the UWB signal 110 includes the periods of time when the sine wave signal exists and the other periods of time when the sine wave signal does not exist based on a pulse signal output from the edge detector 31. The frequency of the UWB signal 110 varies in a frequency band. In this example, the frequency band is previously set. Also, a speed at which the frequency of the UWB signal 110 is changed varies. That is, the frequency of the UWB signal 110 is rapidly changed during some periods of time, and is slowly changed in other periods of time.

A rectified signal 111 output from the rectifier 91 is generated by moving upward components of the UWB signal 110 under a reference line to be located over the reference line, and thus, allowing components to be located only over the reference line. Accordingly, half-period signals of the sine wave signal are located only over the reference line.

An envelope detection signal 112 output from the low-pass filter 92 is generated by passing only a low-frequency component from among frequency components of the rectified signal 111. Accordingly, the envelope detection signal 112 is a pulse signal close to a DC signal. As shown in FIG. 9, the envelope detection signal 112 is generated by passing the rectified signal 111 through the low-pass filter 92. Referring again to FIG. 10, the envelope detection signal 112 is a line contacting all ripples of the rectified signal 111.

Figure 11:
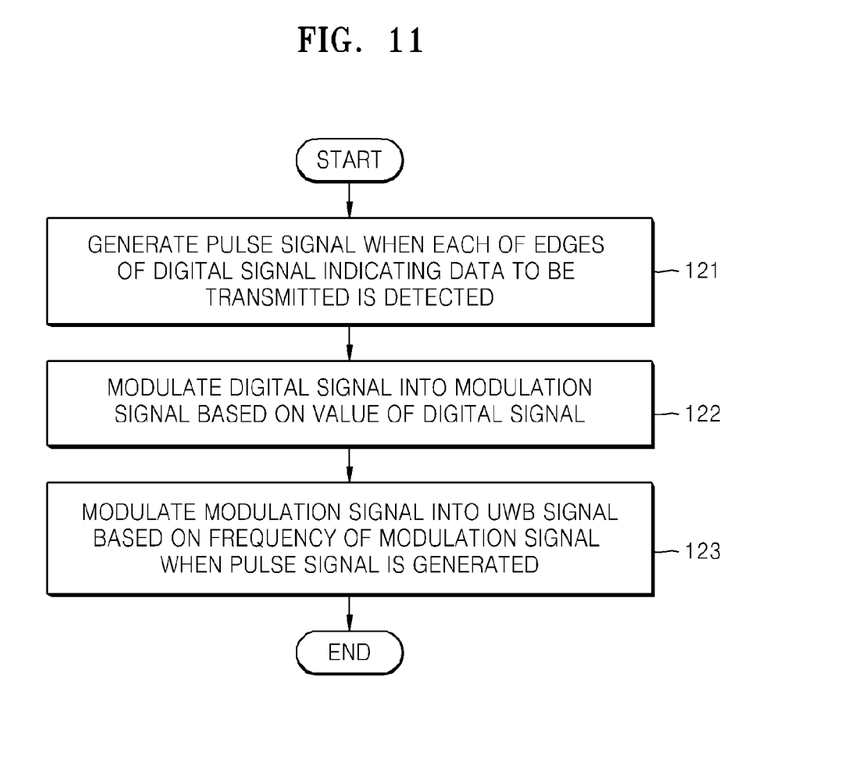
FIG. 11 is a flowchart illustrating an example of a method of modulating a digital signal in the transmitter.

FIG. 11 is a flowchart illustrating an example of a method of modulating a digital signal in the transmitter 10. Referring to FIG. 11, the method includes operations sequentially performed by the transmitter 10 of FIG. 3. Accordingly, although omitted, the description given with reference to the transmitter 10 applies to the method of FIG. 11. The method of FIG. 11 includes the following operations.

In operation 121, the edge detector 31 of the transmitter 10 receives the digital signal, and generates and outputs a pulse signal when each of edges of a digital signal indicating data to be transmitted is detected or received by the edge detector 31. The digital signal includes a high voltage and a low voltage. An edge of the digital signal indicates that the digital signal is changed from the high voltage to the low voltage, or from the low voltage to the high voltage. The edge detector 31 detects the edges of the digital signal, and generates and outputs the pulse signal when each of the edges of the digital signal is detected. The method of detecting the edges of the digital signal in the edge detector 31 has already been described in detail with reference to FIG. 5. The pulse signal is output to the FSK modulator 32, the FM modulator 33, and/or the amplifier 34 to enable the FSK modulator 32, the FM modulator 33, and/or the amplifier 34 to operate.

In operation 122, the FSK modulator 32 of the transmitter 10 receives the digital signal, and modulates the digital signal into a modulation signal based on a value of the digital signal to output the modulation signal. For example, the FSK modulator 32 generates the modulation signal including a frequency that is previously set based on a voltage of the digital signal. That is, when the voltage of the digital signal is a low voltage, the FSK modulator 32 may generate the modulation signal to include a low frequency, when the voltage of the digital signal is a high voltage, the FSK modulator 32 may generate the modulation signal to include a high frequency, or vice versa. In this example, the low frequency and the high frequency are previously determined. For example, the low frequency may be 1 MHz, and the high frequency may be 5 MHz.

In operation 123, the FM modulator 33 of the transmitter 10 receives the modulation signal from the FSK modulator 32, and modulates the modulation signal into a UWB signal based on a frequency of the modulation signal to output the UWB signal. The FM modulator 33 modulates the modulation signal only during periods of time when the FM modulator 33 receives the pulse signal from the edge detector 31, i.e., when the pulse signal is generated. Accordingly, since the FM modulator 33 does not operate when the FM modulator 33 does not receive the pulse signal, power consumption may be reduced compared to a case where the FM modulator 33 operates continuously. The modulation signal received from the FM modulator 33 includes periods of time when the modulation signal is rapidly and slowly, repeatedly increased and decreased in voltage. For example, the FM modulator 33 may generate and output a sine wave signal whose frequency is increased when the modulation signal is increased in voltage, and is decreased when the modulation signal is decreased in voltage. Since a speed at which the modulation signal is repeatedly increased and decreased in voltage is changed, a speed at which the frequency of the signal output from the FM modulator 33 is increased and decreased is also changed accordingly.

Figure 12:
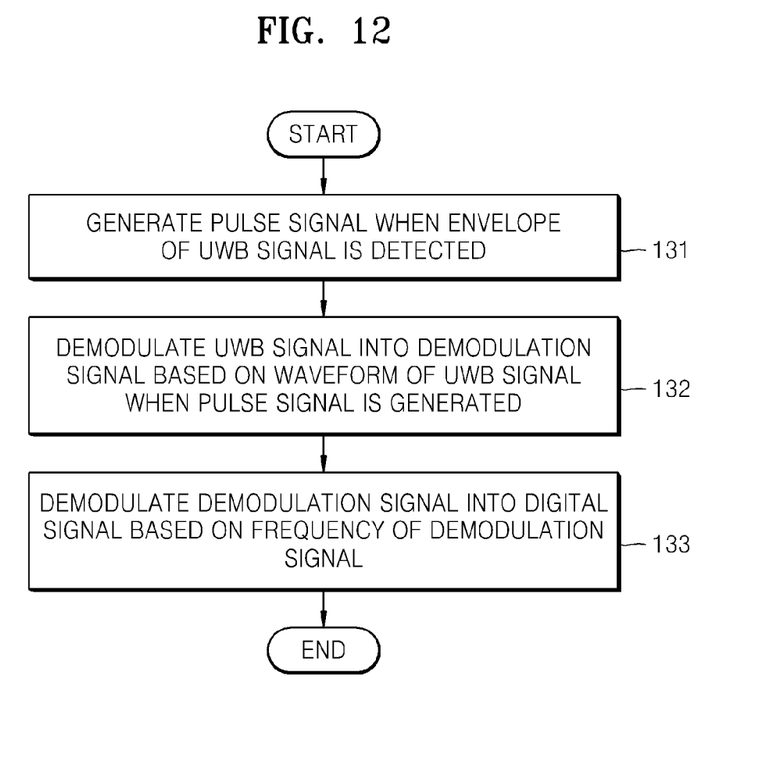
FIG. 12 is a flowchart illustrating an example of a method of demodulating a UWB signal in the receiver.

FIG. 12 is a flowchart illustrating an example of a method of demodulating a UWB signal in the receiver 11. Referring to FIG. 12, the method includes operations sequentially performed by the receiver 11 of FIG. 3. Accordingly, although omitted, the description given with reference to the receiver 11 applies to the method of FIG. 12. The method of FIG. 12 includes the following operations.

In operation 131, the envelope detector 71 of the receiver 11 receives a UWB signal from the transmitter 10, and generates and outputs a pulse signal when an envelope of the UWB signal is detected or received by the envelope detector 71. The envelope is a curve contacting all ripples of the UWB signal. For example, when the UWB signal is a sine wave signal, the envelope may be a straight line contacting all waves of the sine wave signal. Accordingly, the pulse signal may be close to a DC signal. Since the UWB signal is output from the transmitter 10 only when a pulse signal is generated by the edge detector 31 of the transmitter 10, the UWB signal may be received during some periods of time, and may not be received during other periods of time. Accordingly, the pulse signal output from the envelop detector 71 may be output during the periods of time when the UWB signal is received, and may not be received during the other periods of time when the UWB signal is not received. The method of detecting the envelope of the UWB signal in the envelope detector 71 has already been described in detail with reference to FIG. 9.

In operation 132, the FM demodulator 73 of the receiver 11 receives the UWB signal from the transmitter 10, and demodulates the UWB signal into a demodulation signal based on a frequency of the UWB signal to output the demodulation signal. The FM demodulator 73 demodulates the UWB signal only during periods of time when the FM demodulator 73 receives the pulse signal from the envelope detector 71, i.e., when the pulse signal is generated. Accordingly, since the FM demodulator 73 does not operate when the FM demodulator 73 does not receive the pulse signal (since power supply to the FM demodulator 73 is cut off), power consumed by the FM demodulator 73 may be reduced compared to a case where the FM demodulator 73 operates continuously. The FM demodulator 73 generates and outputs the demodulation signal proportional to a frequency of the UWB signal. In this example, an amplitude of the demodulation signal is previously set in a variation range based on the frequency of the UWB signal. For example, the FM demodulator 73 may generate and output the demodulation signal to be increased in voltage when the frequency of the UWB signal is increased, and to be decreased in voltage when the frequency of the UWB signal is decreased. For example, when the UWB signal is changed from 3 GHz to 4 GHz, the demodulation signal may be previously set to be changed from 0 V to 5 V.

In operation 133, the FSK demodulator 74 of the receiver 11 demodulates the demodulation signal into a digital signal based on a frequency of the demodulation signal to output the digital signal. The digital signal is a DC signal including a high voltage and a low voltage. The FSK demodulator 74 outputs the DC signal to include the high voltage when the demodulation signal includes a high frequency, and outputs the DC signal to include the low voltage when the demodulation signal includes a low frequency.

According to the teachings above, there is provided a transmitter and a receiver, which may reduce power consumption by generating a pulse signal and controlling modulators and demodulators to operate only when such modulators and demodulators receive the pulse signal.

The units described herein may be implemented using hardware components and software components. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A transmitter comprising:
a detector configured to generate a pulse signal in response to a detection of an edge of a digital signal;

a first modulator configured to modulate the digital signal into a first modulation signal, based on a value of the digital signal; and a second modulator configured to, while the pulse signal exists, modulate the first modulation signal into a second modulation signal, based on a frequency of the first modulation signal.

2. The transmitter of claim 1, wherein:

the second modulator is further configured to be cut off from a power supply while the pulse signal does not exist.

3. The transmitter of claim 1, wherein:

the first modulator is further configured to output the first modulation signal while the pulse signal exists.

4. The transmitter of claim 1, wherein:

the first modulator is further configured to be cut off from a power supply while the pulse signal does not exist.

5. The transmitter of claim 1, further comprising:

an amplifier configured to amplify the second modulation signal while the pulse signal exists.

6. The transmitter of claim 1, further comprising:

an amplifier configured to
- amplify the second modulation signal, and
- be cut off from a power supply while the pulse signal does not exist.

7. The transmitter of claim 1, wherein the detector comprises:

a time delay unit configured to delay the digital signal by a predetermined period of time to generate a delayed signal; and an XOR gate configured to
- not output the pulse signal when the digital signal and the delayed signal comprise the same voltage, and
- output the pulse signal when the digital signal and the delayed signal comprise different voltages.

8. A transmitting method comprising:

generating a pulse signal in response to a detection of an edge of a digital signal;

modulating the digital signal into a first modulation signal, based on a value of the digital signal; and modulating, while the pulse signal exists, the first modulation signal into a second modulation signal, based on a frequency of the first modulation signal.

9. The transmitting method of claim 8, further comprising:

determining the frequency of the first modulation signal, based on the value of the digital signal; and determining a waveform of the second modulation signal, based on the frequency of the first modulation signal, wherein the second modulation signal is an ultra-wideband (UWB) signal.

* * * * *